(12) United States Patent
Nagurny et al.

(10) Patent No.: US 9,457,873 B2
(45) Date of Patent: *Oct. 4, 2016

(54) ON-SITE FABRICATED FIBER-COMPOSITE FLOATING PLATFORMS FOR OFFSHORE APPLICATIONS

(75) Inventors: Nicholas J. Nagurny, Manassas, VA (US); Alan K. Miller, Santa Cruz, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 563 days.

This patent is subject to a terminal disclaimer.

(21) Appl. No.: 13/329,645

(22) Filed: Dec. 19, 2011

(65) Prior Publication Data

US 2012/0155967 A1    Jun. 21, 2012

Related U.S. Application Data

(60) Provisional application No. 61/425,548, filed on Dec. 21, 2010.

(51) Int. Cl.
*B63B 9/06* (2006.01)
*B63B 5/24* (2006.01)
*B63B 35/44* (2006.01)

(52) U.S. Cl.
CPC ............ *B63B 9/065* (2013.01); *B63B 5/24* (2013.01); *B63B 35/44* (2013.01); *F03D 13/22* (2016.05); *B63B 2009/067* (2013.01); *B63B 2035/442* (2013.01); *B63B 2035/446* (2013.01); *B63B 2231/52* (2013.01); *F05B 2240/93* (2013.01); *F05B 2240/95* (2013.01); *F05B 2280/6003* (2013.01); *Y02E 10/727* (2013.01)

(58) Field of Classification Search
CPC .............................................. E02B 2017/0091
USPC ........ 405/5, 222, 223, 223.1, 224, 203, 204, 405/205, 206, 207, 208, 209; 52/834, 841, 52/843, 844, 845, 847, 848, 852, 854
See application file for complete search history.

(56) References Cited

U.S. PATENT DOCUMENTS 2,690,769 A * 10/1954 Brown ................ B29D 23/001
 138/125
2,766,160 A   10/1956 Bentov
(Continued)

FOREIGN PATENT DOCUMENTS

FR   707101   7/1931
GB   790639   2/1958
(Continued)

OTHER PUBLICATIONS

Hindenlang, Alison L., "U.S. Appl. No. 13/184,745 Office Action Apr. 25, 2012", , Publisher: USPTO, Published in: US.
(Continued)

*Primary Examiner* — Benjamin Fiorello
*Assistant Examiner* — Edwin Toledo-Duran
(74) *Attorney, Agent, or Firm* — Withrow & Terranova, PLLC

(57) ABSTRACT

A spar platform comprises one or more continuous-fiber composite tubes fabricated at or near the intended site use of the platform. In some embodiments, the spar platform includes a relatively longer central tube and relatively shorter peripheral tubes. In some other embodiments, the spar platform is a single long tube. In some embodiments, the spar platform supports a wind turbine assembly. The continuous-fiber composite tubes are formed, in either a vertical or horizontal orientation, using a modified vacuum assisted resin transfer molding process.

16 Claims, 13 Drawing Sheets

(56) References Cited

U.S. PATENT DOCUMENTS

| | | | | |
|---|---|---|---|---|
| 2,810,424 | A | * | 10/1957 | Swartswelter ...... B29C 47/0023 138/126 |
| 3,033,730 | A | | 5/1962 | Martin |
| 3,067,803 | A | | 12/1962 | Fleury |
| 3,130,104 | A | | 4/1964 | Lewis et al. |
| 3,490,983 | A | * | 1/1970 | Lee ...................... B29C 53/582 138/144 |
| 3,769,127 | A | | 10/1973 | Goldsworthy et al. |
| 3,855,031 | A | | 12/1974 | McNeely et al. |
| 3,975,479 | A | | 8/1976 | McClean |
| 4,248,062 | A | * | 2/1981 | McLain ................ B29C 70/085 138/130 |
| 4,336,415 | A | * | 6/1982 | Walling .................. F16L 11/22 138/111 |
| 4,558,971 | A | | 12/1985 | David |
| 4,728,224 | A | * | 3/1988 | Salama ................. B63B 21/502 166/367 |
| 4,830,809 | A | | 5/1989 | Liebl |
| 5,048,441 | A | * | 9/1991 | Quigley .............. B29C 53/8008 114/90 |
| 5,188,872 | A | * | 2/1993 | Quigley .............. B29C 53/8058 114/102.31 |
| 5,555,838 | A | * | 9/1996 | Bergman ................ B63B 35/44 114/265 |
| 5,875,728 | A | * | 3/1999 | Ayers ................. B63B 35/4413 114/264 |
| 5,908,049 | A | * | 6/1999 | Williams .............. E21B 17/206 138/125 |
| 6,016,845 | A | * | 1/2000 | Quigley .................... E04C 1/06 138/125 |
| 6,220,303 | B1 | * | 4/2001 | Secher .................. E21B 17/017 138/109 |
| 6,305,427 | B1 | * | 10/2001 | Priest, II ................. F16L 11/12 138/104 |
| 6,402,431 | B1 | * | 6/2002 | Nish ..................... E21B 17/012 405/224.3 |
| 6,575,665 | B2 | * | 6/2003 | Richter ..................... B63B 3/04 114/125 |
| 6,648,074 | B2 | * | 11/2003 | Finn ........................ B63B 21/50 166/350 |
| 6,772,840 | B2 | * | 8/2004 | Headworth ............. E21B 17/18 166/302 |
| 6,805,201 | B2 | * | 10/2004 | Nish ..................... E21B 17/012 166/350 |
| 6,817,309 | B2 | * | 11/2004 | Horton .................... B63B 9/065 114/264 |
| 6,899,842 | B1 | | 5/2005 | Corre et al. |
| 7,096,940 | B2 | * | 8/2006 | Baxter ................. E21B 17/1085 166/241.6 |
| 7,377,225 | B2 | * | 5/2008 | Finn ........................ B63B 21/50 114/264 |
| 7,393,158 | B2 | * | 7/2008 | Caldwell ............... E21B 17/017 166/241.6 |
| 8,025,834 | B2 | | 9/2011 | Miller et al. |
| 8,066,033 | B2 | * | 11/2011 | Quigley .................... D04C 1/06 138/114 |
| 8,281,547 | B2 | * | 10/2012 | Hettick ................... B29C 70/30 52/745.17 |
| 2003/0140838 | A1 | * | 7/2003 | Horton, III ............. B63B 9/065 114/264 |
| 2009/0193808 | A1 | | 8/2009 | Fiske |
| 2009/0196756 | A1 | * | 8/2009 | Althoff ................. F03D 1/0675 416/226 |
| 2009/0211173 | A1 | * | 8/2009 | Willey ................... B29C 70/222 52/40 |
| 2009/0266004 | A1 | * | 10/2009 | Willey ................... B29C 70/086 52/40 |
| 2009/0309271 | A1 | * | 12/2009 | Miller ................... B29C 70/443 264/563 |
| 2009/0317585 | A1 | * | 12/2009 | Bech ....................... B29B 11/16 428/113 |
| 2011/0061332 | A1 | * | 3/2011 | Hettick ................... B29C 70/30 52/651.07 |
| 2011/0062639 | A1 | * | 3/2011 | Miller ..................... B29C 70/44 264/571 |
| 2011/0162748 | A1 | * | 7/2011 | Morand .................. E21B 17/01 138/109 |
| 2011/0169190 | A1 | * | 7/2011 | Miller ................... B29C 70/443 264/257 |
| 2011/0173978 | A1 | * | 7/2011 | Rekret ...................... F03G 7/05 60/641.7 |

FOREIGN PATENT DOCUMENTS

| | | |
|---|---|---|
| GB | 1453936 | 10/1976 |
| GB | 2139170 A | 11/1984 |
| GB | 2430965 A | 4/2007 |
| GB | 2446506 A | 8/2008 |
| JP | 4636779 Y1 | 12/1971 |
| JP | 4964665 | 6/1974 |
| JP | 09011355 A | 1/1997 |
| WO | 2006121337 A1 | 11/2006 |
| WO | 2007003011 A1 | 1/2007 |

OTHER PUBLICATIONS

"Related JP Patent Application No. JP 2011-513748 Office Action", Oct. 31, 2013, Publisher: JPO, Published in: JP.

FC Campbell, "Manufacturing Processes for Advanced Composites", "XP002640655", Jan. 1, 2004, pp. 432-437, vol. ISBN 978-1-185617-41, Publisher: Elsevier Advanced Technology, Oxford, GB, Published in: GB.

"Related EP Patent Application No. 09 763 797.9 Office Action", Sep. 20, 2012, Publisher: EPO, Published in: EP.

"Related U.S. Appl. No. 13/070,618 Notice of Allowability", Mar. 6, 2013, Publisher: USPTO, Published in: US.

"Related U.S. Appl. No. 13/184,745 Notice of Allowability", Aug. 31, 2012, Publisher: USPTO, Published in: US.

Officer: Paul Lendfers, "International Search Report and Written Opinion of the International Searching Authority", Jul. 16, 2012, Publisher: PCT, Published in: EPO.

"Resin Transfer Molding and Structural Reaction Injection Molding", "ASM Handbook—Composites XP002552279", 2001, pp. 492-500, vol. 21, Publisher: ASM International, Published in: US.

Fregosi, Alberto, "PCT Application No. PCT/US2009/047388 International Preliminary Report on Patentability Oct. 21, 2010", , Publisher: PCT, Published in: PCT.

Fregosi, Alberto, "PCT Application No. PCT/US2009/047388 International Search Report Feb. 15, 2010", , Publisher: PCT, Published in: PCT.

"PCT Application No. PCT/US2009/047388 Partial Search Report Nov. 20, 2009", , Publisher: EPO, Published in: PCT.

Hindenlang, Alison L., "U.S. Appl. No. 12/484,779 Notice of Allowance Jun. 17, 2011", , Publisher: USPTO, Published in: US.

Hindenlang, Alison L., "U.S. Appl. No. 12/484,779 Office Action Jan. 21, 2011", , Publisher: USPTO, Published in: US.

Hindenlang, Alison L., "U.S. Appl. No. 12/484,779 Restriction Requirement Dec. 6, 2010", , Publisher: USPTO, Published in: US.

Hindenlang, Alison L., "U.S. Appl. No. 12/951,239 Office Action Apr. 12, 2012", , Publisher: USPTO, Published in: US.

Author Unknown, "Hywind: Siemens and StatoilHydro install first floating wind turbine," Siemens AG, Jun. 10, 2009, http://www.siemens.com/press/en/presspicture/?press=/en/presspicture/2009/renewable_energy/ere200906064-01.htm, 2 pages.

Author Unknown, "Large-Scale Offshore Wind Power in the United States: Assessment of Opportunites and Barriers," National Renewable Energy Laboratory, Sep. 2010, 240 pages.

Helder, D., "Blue H: The World's First Floating Wind Turbine," Essential Innovations presentation, Feb. 12, 2009, Netherlands, 22 slides.

Musial, W. et al., "Feasibility of Floating Platform Systems for Wind Turbines," Preprint to be presented at the 23rd ASME Wind Energy Symposium, Reno, Nevada, Jan. 5-8, 2004, NREL, 14 pages.

Roddier, D. et al., "Floating Wind Turbines," Mechanical Engineering, Apr. 2010, 5 pages.

* cited by examiner

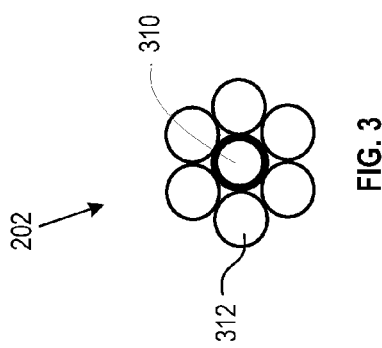
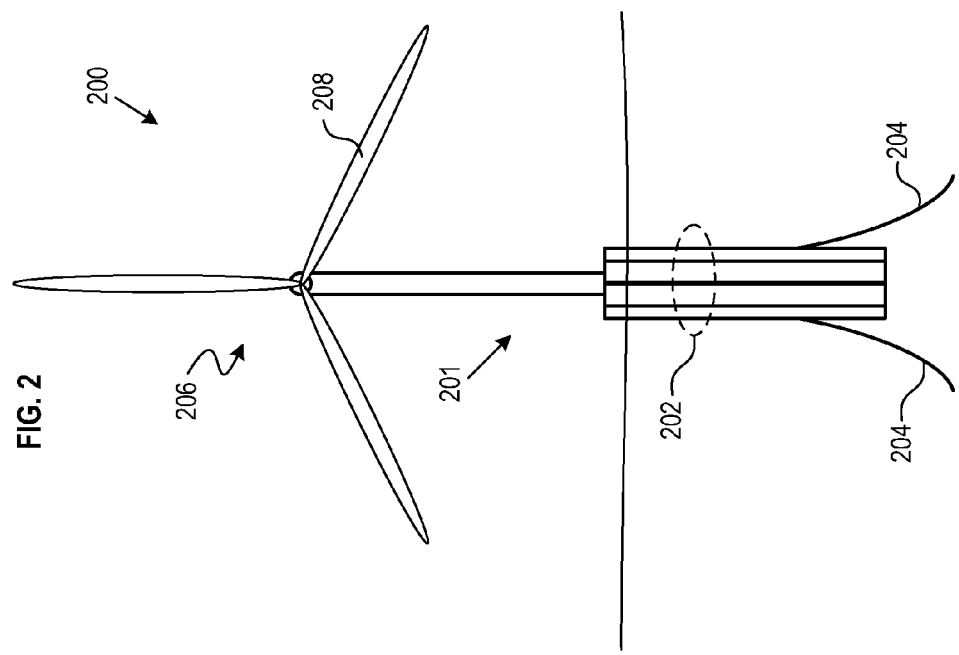

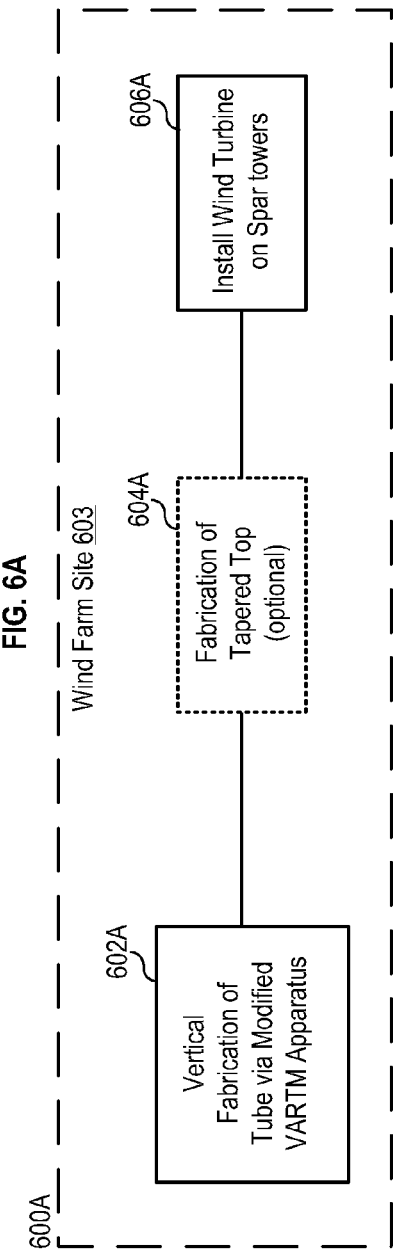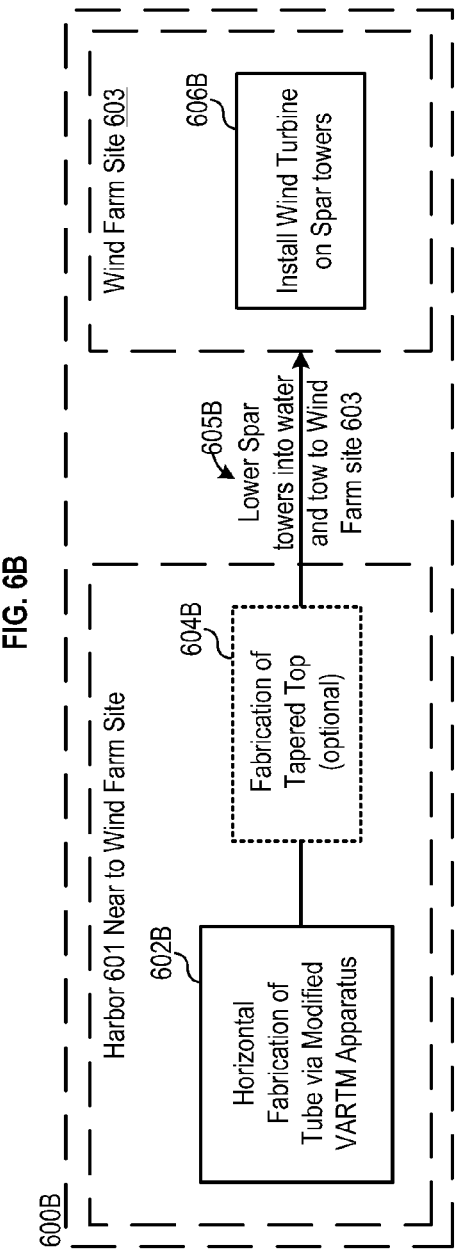

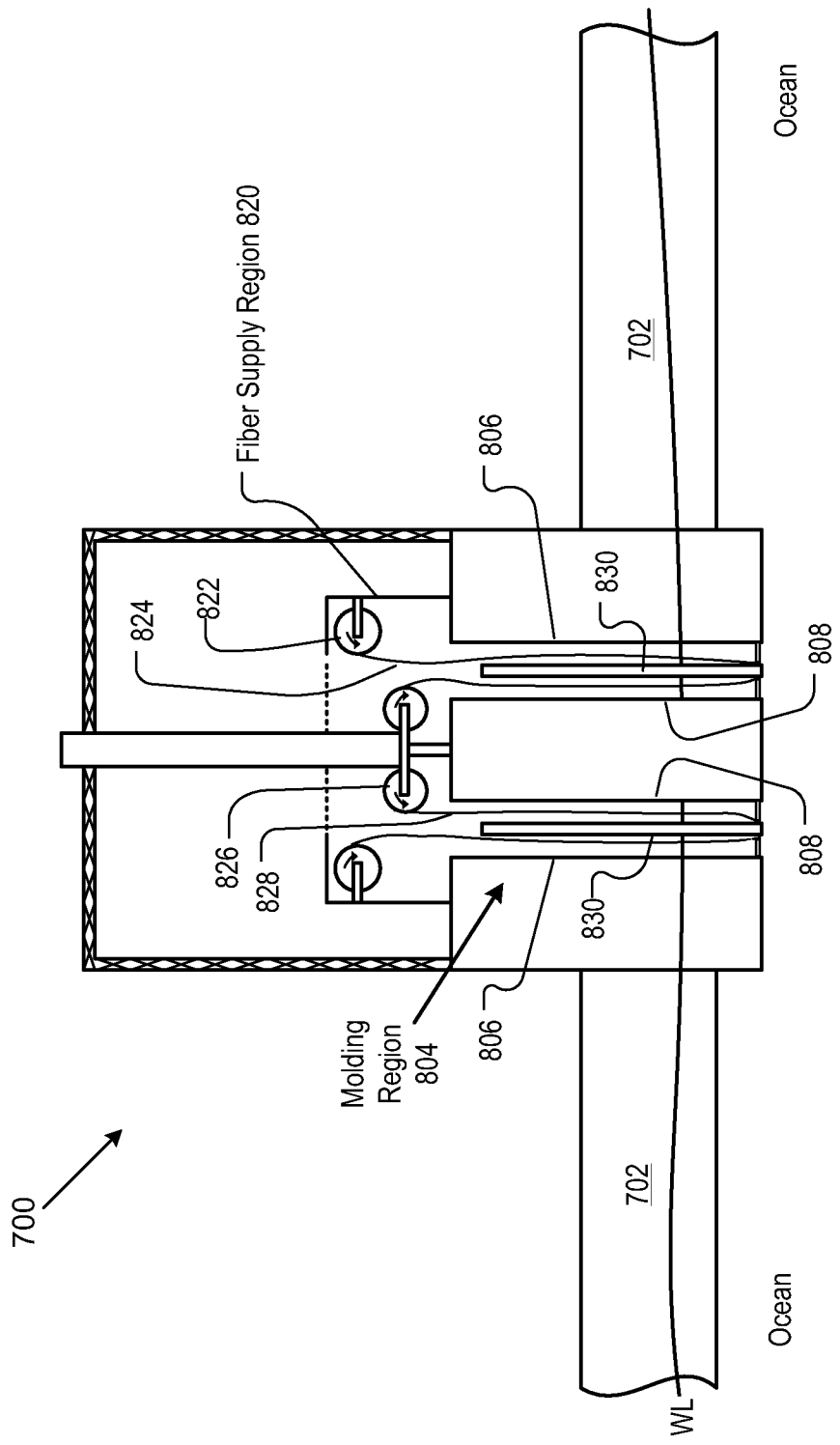

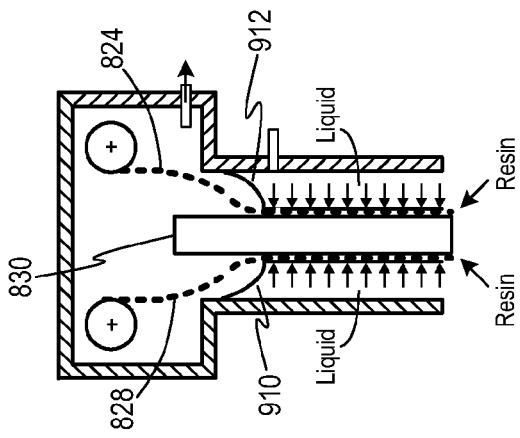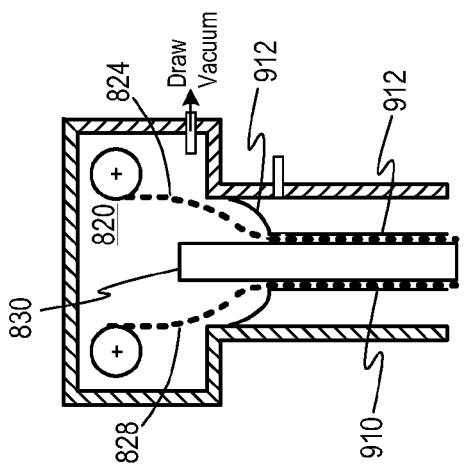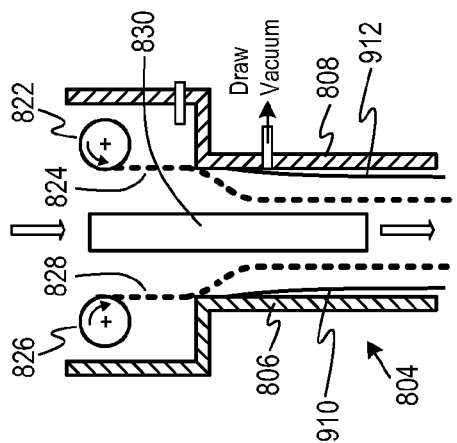

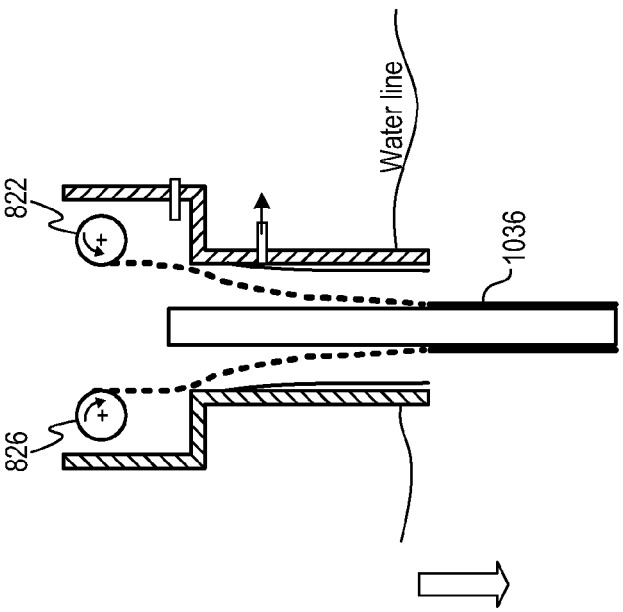
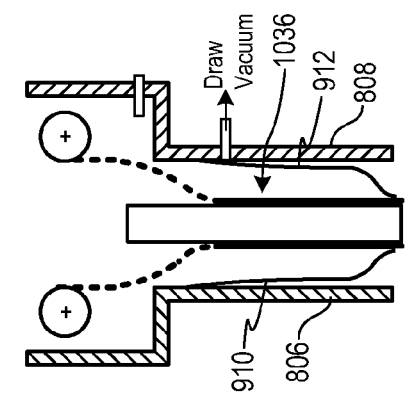

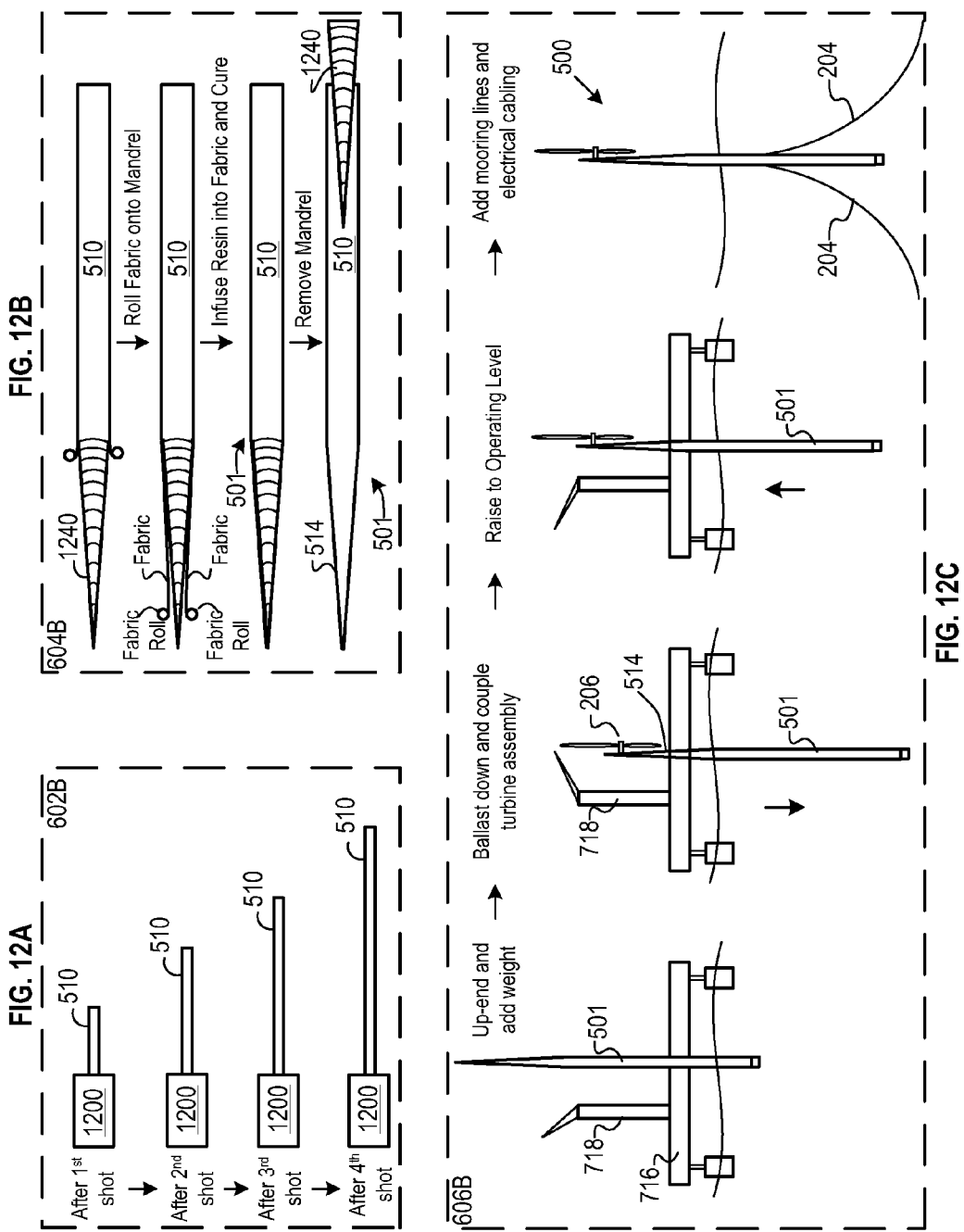

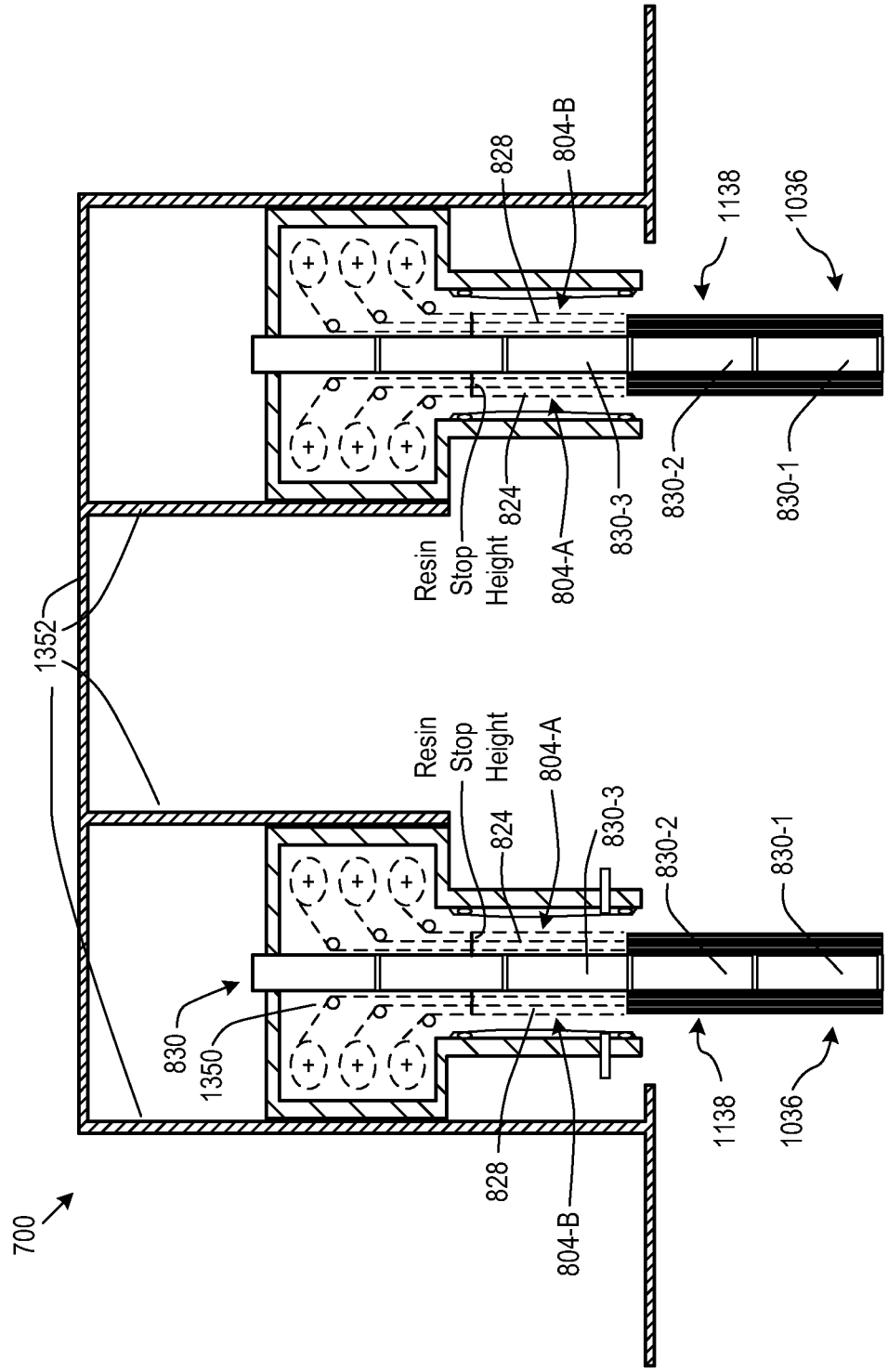

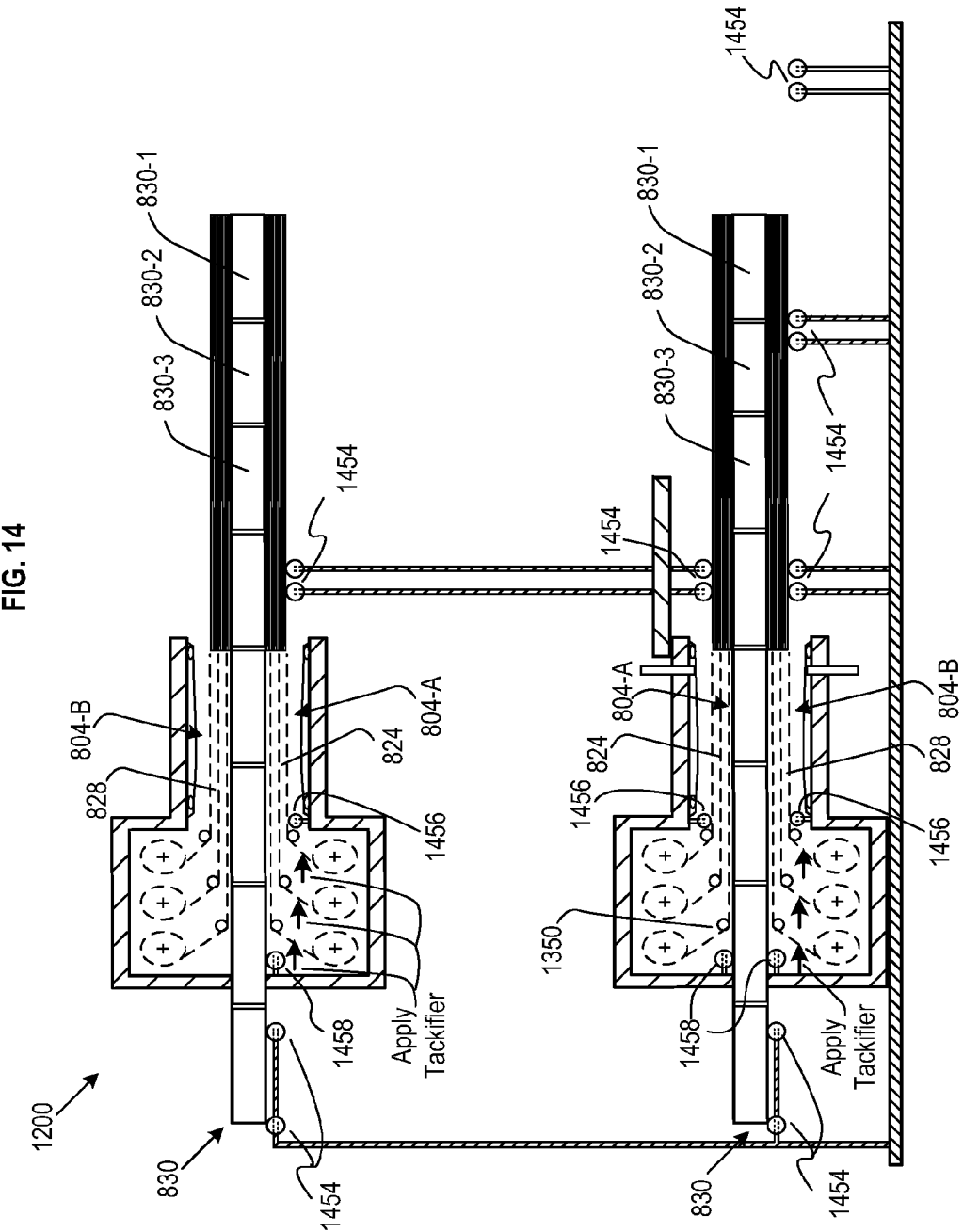

ON-SITE FABRICATED FIBER-COMPOSITE FLOATING PLATFORMS FOR OFFSHORE APPLICATIONS

STATEMENT OF RELATED APPLICATIONS

This case claims priority to U.S. Provisional Patent Application Ser. No. 61/425,548, which was filed on Dec. 21, 2010 and is incorporated by reference herein.

FIELD OF THE INVENTION

The present invention relates to offshore floating platforms.

BACKGROUND OF THE INVENTION

Wind power has been in use by humans for thousands of years. Windmills have been used for irrigation, pumping, and milling grain since the $7^{th}$ Century A.D. and wind has been propelling sailing ships since well before 3000 B.C. By the late $19^{th}$ Century, the first electricity-producing, wind-powered machines were developed.

The modern wind-power industry began in the late 1970s. In modern installations, referred to as "wind farms," multiple individual wind turbines are interconnected via a medium-voltage power-collection system and communications network. At a substation, this medium-voltage current is stepped up in voltage for connection to the high-voltage electric power grid.

The wind provides an estimated 72 terawatts of potentially economically extractable power. This is about five times the 2005 average global power consumption from all sources. In view of the significant environmental and/or geopolitical issues with most other major sources of energy (e.g., oil, coal, nuclear), there has been an increasing interest in the U.S. and abroad in satisfying at least a portion of energy demands via wind power. Although there are some environmental concerns about wind-energy production sites, notably aesthetic considerations (i.e., homeowners' "views") and noise, they are largely mitigated by locating the installations at offshore locations.

The majority of potential high-quality offshore wind-energy production sites, including about 60 percent of the total U.S. offshore potential wind-energy sites, are in deep-water locations (i.e., greater than 60 meters depth). Relative to land-based or shallower offshore sites, these locations require relatively higher capital investment due to the costs of towing the shipyard-fabricated equipment to the offshore site, deploying it at site, and mooring it.

Floating platforms are most suitable for supporting wind turbines at deepwater sites. There are three types of floating platforms typically considered for this service: tension leg platforms, semi-submersible platforms, and spar platforms. FIG. 1 depicts these floating platforms, as well as two other fixed platforms for use in relatively shallower waters.

The tension-leg platform (TLP) is vertically moored via tethers or tendons grouped at each of the structure's corners. A group of tethers is called a "tension leg." The tethers have relatively high axial stiffness (low elasticity), such that virtually all vertical motion of the platform is eliminated.

A semi-submersible platform obtains its buoyancy from ballasted, watertight pontoons located below the ocean surface and wave action. With much of its hull structure submerged at a deep draft, the semi-submersible platform is minimally-affected by wave loadings. The operating deck can be located well above the sea level due to the stability of the concept (more advantageous for oil drilling applications than for wind turbines). Structural columns connect the pontoons and operating deck. Semi-submersible platforms can be ballasted up or down by altering the amount of flooding in buoyancy tanks. They are typically anchored to the seabed by combinations of chain, wire rope or polyester rope, although they can also be kept in place via dynamic positioning.

A spar platform consists of a large-diameter, single vertical cylinder supporting a deck. The name for the platform derives from the logs or "spars" that are moored vertically and used as buoys in shipping. The spar platform contains a deep-draft floating caisson, which is a hollow cylindrical structure similar to a very large buoy. Most of the structure is underwater and, as a consequence of its deep-draft hull, the spar platform has very favorable motion characteristics.

Spar platforms are moored to the seabed like tension leg platforms, but whereas a TLP has vertical tension tethers, a spar has more conventional mooring lines. Spars have to-date been designed in three configurations: the "conventional" one-piece cylindrical hull, the "truss spar" where the midsection is composed of truss elements connecting the upper buoyant hull (called a hard tank) with the bottom soft tank containing permanent ballast, and the "cell spar" which is built from multiple vertical cylinders stacked one above the other. The spar has more inherent stability than a TLP since it has a large counterweight at the bottom and does not depend on the mooring to hold it upright.

To date, only a spar platform has been used in a deepwater offshore wind turbine demonstration. To create and install the spar platform at that location required:
  Fabricating the spar in the form of a long, cylindrical, steel hull at a shipyard, etc.
  Towing the spar to a protected water site (calm waters);
  Upending the spar using cranes located on barges, etc.
  Adding a middle tower;
  Adding an upper tower for supporting the rotor;
  Fitting the rotor on the upper tower;
  Towing the assemblage to the final location; and
  Installing the anchoring system.

As indicated above, current steel-spar technology for offshore wind-power installations relies on upending of the spar and assembly of the tower in protected deep waters. There are relatively few locations, such as Norwegian fjords, that meet these depth and weather-protection criteria. A different approach to the fabrication and installation of a deepwater offshore floating platform could greatly expand the number of offshore locations at which wind turbines can be installed.

SUMMARY

The present invention provides a spar platform and methods for its fabrication. In the illustrative embodiment, the spar platform is used to support a turbine assembly, thereby providing an off-shore wind turbine. In other embodiments, the spar platform can be used for other purposes, such as to serve as the support for an off shore oil platform, etc.

In preferred embodiments, the spar platform includes one or more continuous-fiber composite tubes that are formed via a modified vacuum-assisted resin-transfer molding (VARTM) process. This process and an apparatus for carrying it out are disclosed in U.S. Pat. No. 8,025,834 and U.S. Published Pat. Apps. 2011/0169190 and 2011/0062639, all of which are incorporated by reference herein.

Using this process, tubes are formed as a continuous-fiber composite, which means that reinforcing fibers are continuous throughout the composite, as opposed to being chopped or short (i.e., discontinuous). In embodiments that require multiple molding runs "or shots" to fabricate tubes of a desired long length, fabricating a "continuous-fiber composite" requires "continuity of fiber," as achieved by the method described herein. That is, there must be no discontinuity or break in fibers between the multiple workpieces that compose a multi-shot composite article. No other process known to the inventor is capable of producing multi-shot, continuous-fiber composites.

In some embodiments, the molding apparatus is configured as described in the above-referenced patent documents. Specifically, the apparatus is configured to fabricate a continuous-fiber composite tube in a vertical orientation. The molding apparatus is advantageously mounted on a floating platform so that the tube can be fabricated on-site (i.e., at the intended location of use). Tube fabrication proceeds with the tube "growing" downward through an opening in the platform into the water.

By virtue of the fact that the tube is fabricated in a vertical orientation, it does not require "upending" as in the prior art. As such, there is no need for deep protected waters (e.g., fjords, etc.) for the installation process. This greatly expands the number of locations at which wind farms can be established. Also, tubes do not need to be transported since they are fabricated at the site of intended use; only raw materials need be transported. The capital cost of the fiber-composite spar platforms disclosed herein is expected to be 40 percent or less of the installed cost for conventional steel spar platforms.

In some other embodiments, the molding apparatus is configured to fabricate a continuous-fiber composite tube in a horizontal orientation. This requires certain modifications to the apparatuses disclosed in the above-referenced patent documents. For horizontal-fabrication applications, the molding apparatus can be located in a harbor near to the intended deployment site(s) for the wind turbines, etc. Although this approach does not provide some of the benefits of vertical fabrication, a harbor-based fabrication facility is not subject to high winds (e.g., 125 mph), which would occasionally plague a vertical fabrication facility at a wind farm site.

Thus, a spar platform in accordance with the present teachings is assembled by fabricating one or more continuous-fiber composite tubes via the modified VARTM process and apparatus, implemented for either vertical or horizontal fabrication.

In some embodiments, the spar platform comprises a total of seven tubes arranged so that six peripheral tubes surround one central tube. The central tube is typically longer and thicker-walled than the peripheral tubes. The longer central tube will typically require multiple molding runs or shots. Using the referenced modified VARTM process, at least the central tube will be formed as a continuous-fiber composite and exhibit benefits derived therefrom. In some other embodiments, the spar platform comprises a single long tube. In fact, a spar comprising a single long tube is likely to be preferable to a cluster of shorter tubes. One advantage to using a single tube is that a continuous path for the transfer of the bending moment from the tower portion to the spar portion is provided. A second advantage is that since only a single tube is required, there is no need to attach multiple tubes together.

In embodiments in which the spar platform is intended to support a wind turbine, the turbine assembly is attached proximal to the (top) end of the (long) tube. In some embodiments, the tube that is intended to support the turbine assembly comprises a tapered top portion. In such embodiments, the turbine assembly is attached to the tapered portion, proximal to the apex thereof. Mooring lines are attached to either the single long tube or, if present, some or all of the peripheral tubes.

BRIEF DESCRIPTION OF THE DRAWINGS

FIG. 2 depicts an off-shore wind turbine incorporating a spar platform including at least one continuous-fiber composite tube in accordance with a first embodiment of the present invention.

FIG. 3 depicts a cross section of the spar platform depicted in FIG. 2.

FIG. 6A depicts method 600A for forming and installing a wind turbine having a spar platform comprising at least one continuous-fiber composite tube, wherein the continuous-fiber composite tube is formed via vertical fabrication.

FIG. 6B depicts method 600B for forming and installing a wind turbine having a spar platform comprising at least one continuous-fiber composite tube, wherein the continuous-fiber composite tube is formed via horizontal fabrication.

FIG. 8 depicts a vertically-oriented molding apparatus on a moveable floating platform, wherein the molding apparatus is suitable for fabricating a continuous-fiber composite tube in accordance with operation 602A of method 600A.

FIGS. 10A-10E depict the vertical fabrication of a continuous-fiber composite tube via the apparatus of FIGS. 8/9.

FIG. 12A depicts the horizontal fabrication of a continuous-fiber composite tube in accordance with operation 602B of method 600B.

FIG. 12B depicts the fabrication of the tapered apex on a continuous-fiber composite tube in accordance with operation 604B of method 600B.

FIG. 12C depicts the installation of the wind turbine on the spar platform in accordance with operation 606B of method 600B.

FIG. 13 depicts a further view of a vertically-oriented molding apparatus for forming continuous-fiber composite tubes.

FIG. 14 depicts a horizontally-oriented molding apparatus for fabricating a continuous-fiber composite tube in accordance with operation 602B of method 600B.

DETAILED DESCRIPTION

Figure 1:
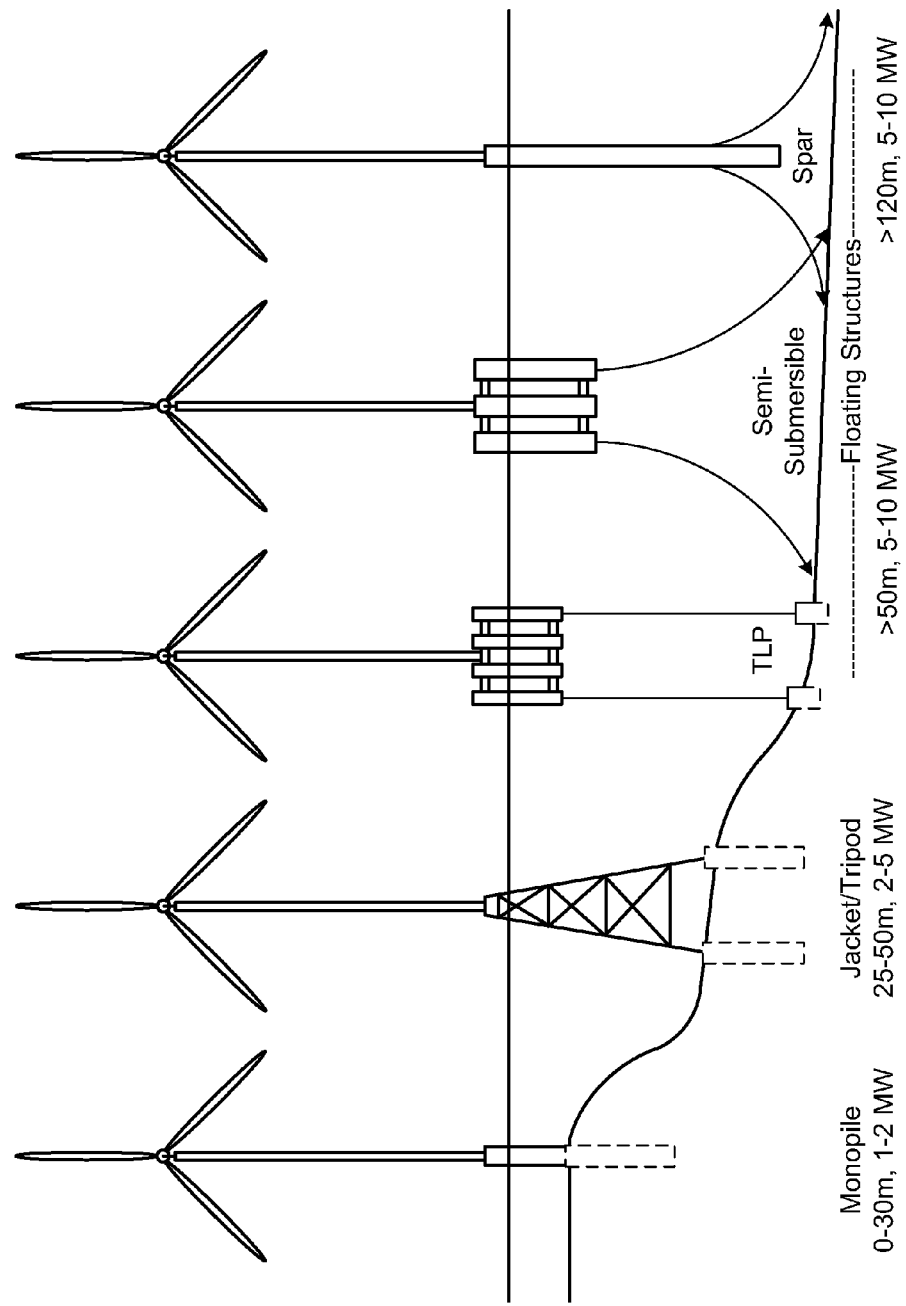
FIG. 1 depicts a variety of prior-art platforms that are suitable for supporting wind turbines at off-shore sites.

Definitions. The terms appearing below are provided with the follow explicit definitions for use in this description and the appended claims.

Continuous-fiber composite means a fiber composite in which fibers are continuous throughout that the composite, as opposed to being chopped or short (i.e., discontinuous).

Shot refers to the amount of resin that is required to fill a mold cavity. A "multi-shot" article requires multiple, sequential resin fills and cures within the mold cavity.

Workpiece means the structure that is produced or the assemblage (e.g., core, fiber, resin) that will form that structure in a single shot in the molding region. In the context of multi-shot articles, the workpiece therefore represents a portion or segment of the final composite article (e.g., a segment of the cold water pipe, etc).

Continuity of fiber means that there is no discontinuity or break in fibers between the workpieces that compose a multi-shot composite article. To achieve this means that there must be no discontinuity in fibers between:

fiber in a supply region and fiber in the molding region of an apparatus for molding composite articles, before or after resin is introduced to the molding region;

fiber in the molding region, either before or after resin is introduced, and a workpiece; and fiber in the supply region and a workpiece.

Multi-shot continuous-fiber composite tubes formed as described herein will exhibit continuity of fiber throughout the multi-shot article.

Embodiments of Off-Shore Wind Turbines.

Referring now to FIG. 2, off-shore wind turbine 200 includes turbine assembly 206 and spar platform 201.

The spar platform, which supports turbine assembly 206, comprises a plurality of tubes 202, mooring lines 204, and electrical cabling (not depicted). In spar platform 201, at least one of tubes 202 is a continuous-fiber composite tube. Mooring lines 204 are coupled to at least some of tubes 202 to moor spar platform 201. The turbine assembly 206 includes blades 208, typically three, as well as a variety of other components that are not depicted (e.g., rotor, brake, gear box, generator, controller, etc.) as is well known in the art.

FIG. 3 depicts a cross section of tubes 202, which are shown to be arranged in a bundle having a central, relatively thicker-walled tube 310 that is surrounded by a plurality of relatively thinner-walled tubes 312. Central tube 310 is much longer than peripheral tubes 312 and serves, at least in part, as a tower to support turbine assembly 206. The tubes, at least peripheral tubes 312, are sealed and provide buoyancy. The use of multiple sealed peripheral tubes "compartmentalizes" the buoyancy of spar platform 201, which is advantageous for damage control purposes.

At least central tube 310 of spar platform 201 is a continuous-fiber composite tube, which is fabricated in accordance with the methods and apparatuses disclosed herein.

Figure 4:
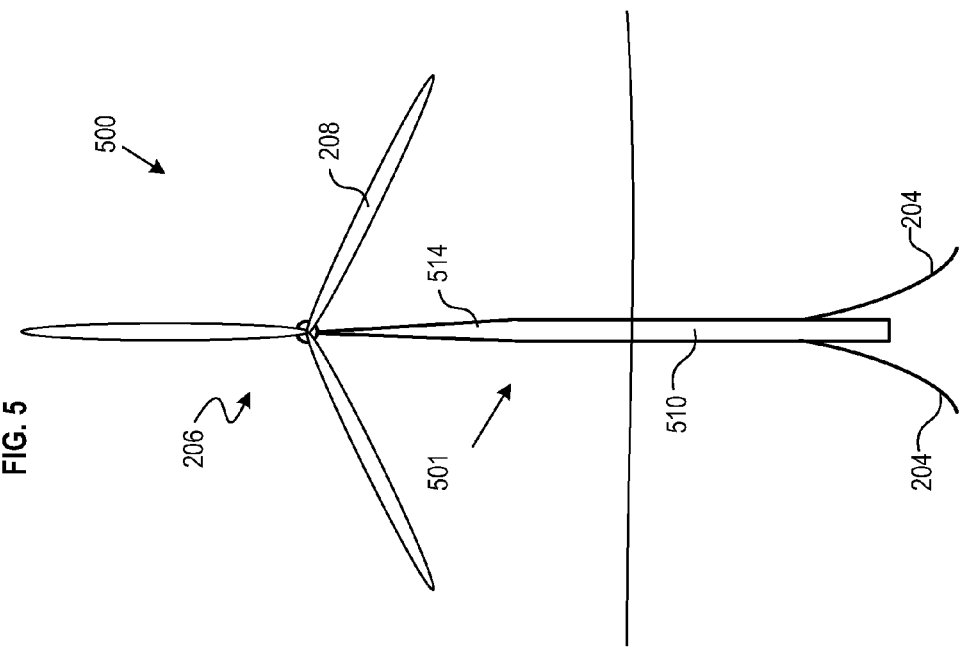
FIG. 4 depicts an off-shore wind turbine incorporating a spar platform comprising a single continuous-fiber composite tube in accordance with a second embodiment of the present invention.

FIG. 4 depicts off-shore wind turbine 400, which is another embodiment of a wind turbine in accordance with the present invention. Wind turbine 400 comprises turbine assembly 206 and spar platform 401.

Unlike wind turbine 200, spar platform 401 comprises a single tube 410. This tube is suitably long enough and strong enough to serve as both the tower that supports turbine assembly 206 and to provide buoyancy. That is, tube 410 is both a "spar" and a support tower. Tube 410 comprises a continuous-fiber composite. Mooring lines 204 are coupled to tube 410 to moor spar platform 401.

Figure 5:
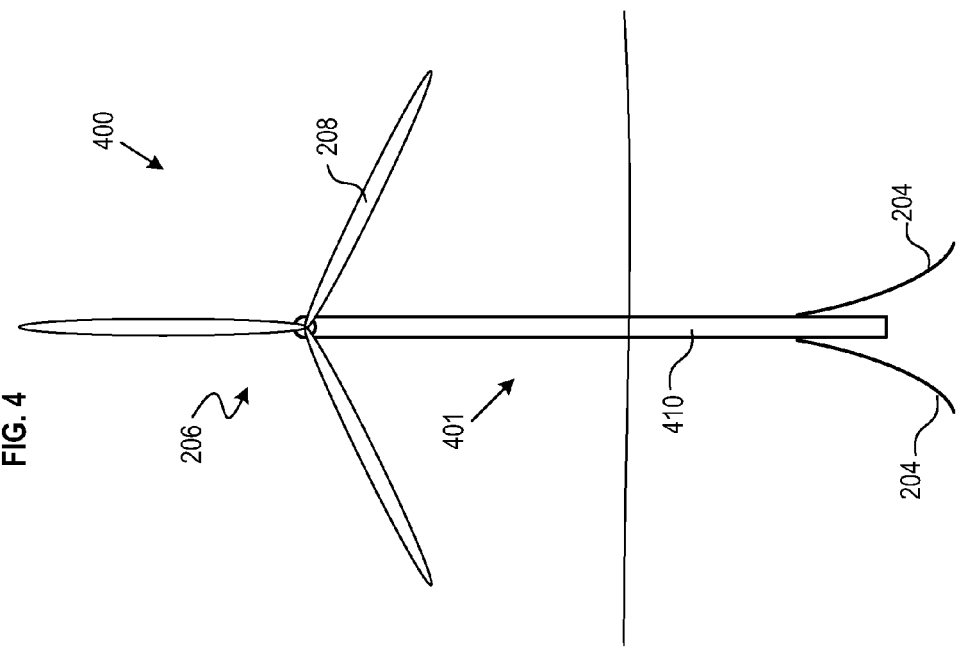
FIG. 5 depicts an off-shore wind turbine incorporating a spar platform comprising a continuous-fiber composite tube with tapered apex in accordance with a third embodiment of the present invention.

FIG. 5 depicts off-shore wind turbine 500, which is another embodiment of a wind turbine in accordance with the present invention. Wind turbine 500 comprises turbine assembly 206 and spar platform 501.

Like spar platform 401, spar platform 501 comprises a single tube 510, which is fabricated as a continuous-fiber composite. Mooring lines 204 are coupled to tube 510 to moor spar platform 501.

Unlike spar platform 401, the upper portion of spar platform 501 comprises tapered region 514. The tapered region supports turbine assembly 206. In some embodiments, tapered region 514 is simply attached (e.g., flanged to, welded to, etc.) to tube 510. In some other embodiments, and more preferably, tapered region 514 and tube 510 are fabricated in such a way as to become "integral" or "unitary" portions of the resulting continuous-fiber composite tapered tower. That is to say, there is continuity of fiber between tube 510 and tapered region 514. This latter approach to fabricating tapered region 514 as an extension of tube 510 provides better transfer of the large bending moment between these two portions. It also eliminates the significant cost and risks of mechanically attaching the tapered region to the tube.

Methods for Fabricating and Installing Off-Shore Wind Turbines.

FIG. 6A depicts method 600A for forming and installing a wind turbine having a spar platform comprising at least one continuous-fiber composite tube, wherein the continuous-fiber composite tube is formed via a vertical fabrication method.

In accordance with method 600A, fabrication is performed at wind farm site 603. Specifically, in operation 602A, a continuous-fiber composite tube (e.g., tubes 310, 410, or 510, etc.) is formed via a vertical fabrication method. Optionally, a tapered region (i.e., tapered region 510) is fabricated as an extension of the continuous-fiber composite tube at optional operation 604A. In operation 606A, a turbine assembly (e.g., blades, rotor, brake, gear box, generator, controller, etc.) is coupled to the spar platform. Further description of method 600A and apparatuses for accomplishing the method are provided in the disclosure accompanying FIGS. 7A, 7B, 8, 9, and 10A-10E.

FIG. 6B depicts method 600B for forming and installing a wind turbine having a spar platform comprising at least one continuous-fiber composite tube, wherein the continuous-fiber composite tube is formed via a horizontal fabrication method.

In accordance with method 600B, fabrication is performed at harbor 601 near to wind farm site 603. Specifically, in operation 602B, a continuous-fiber composite tube (e.g., tubes 310, 410, or 510, etc.) is formed via a horizontal fabrication method. Optionally, a tapered region (i.e., tapered region 510) is fabricated as an extension of the continuous-fiber composite tube at optional operation 604B. In operation 605B, the resulting spar tower is lowered into the water (via a crane, etc.) and towed by barge or like vessel to wind farm site 603. In operation 606B, a turbine assembly (e.g., blades, rotor, brake, gear box, generator, controller, etc.) is coupled to the spar platform. Further description of method 600B and apparatuses for accomplishing the method are provided in the disclosure accompanying FIGS. 12A-12C and 14.

Method 600A—Vertical Fabrication.

Figure 7A:
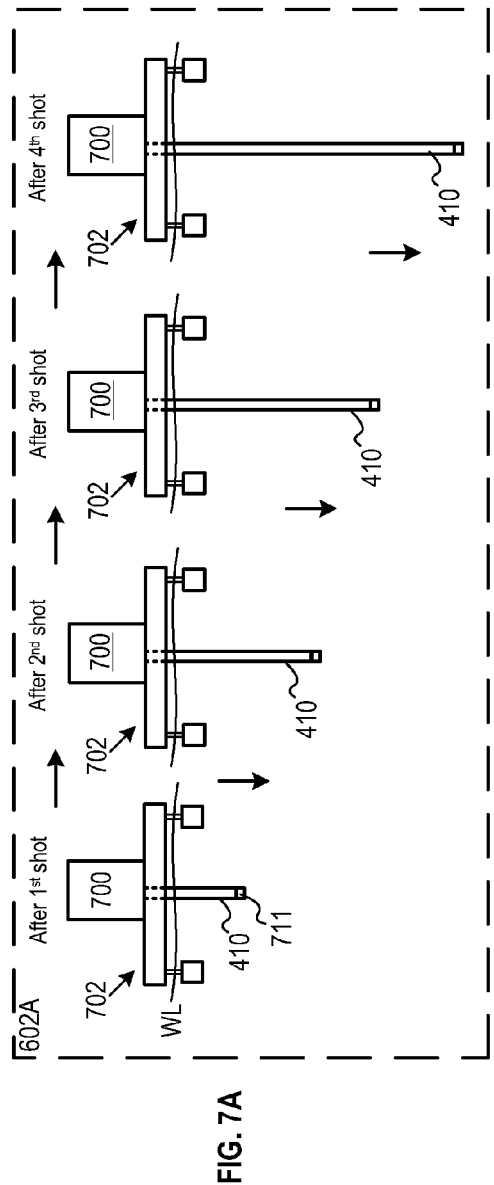
FIG. 7A depicts the vertical fabrication of a continuous-fiber composite tube in accordance with operation 602A of method 600A.
Figure 9:
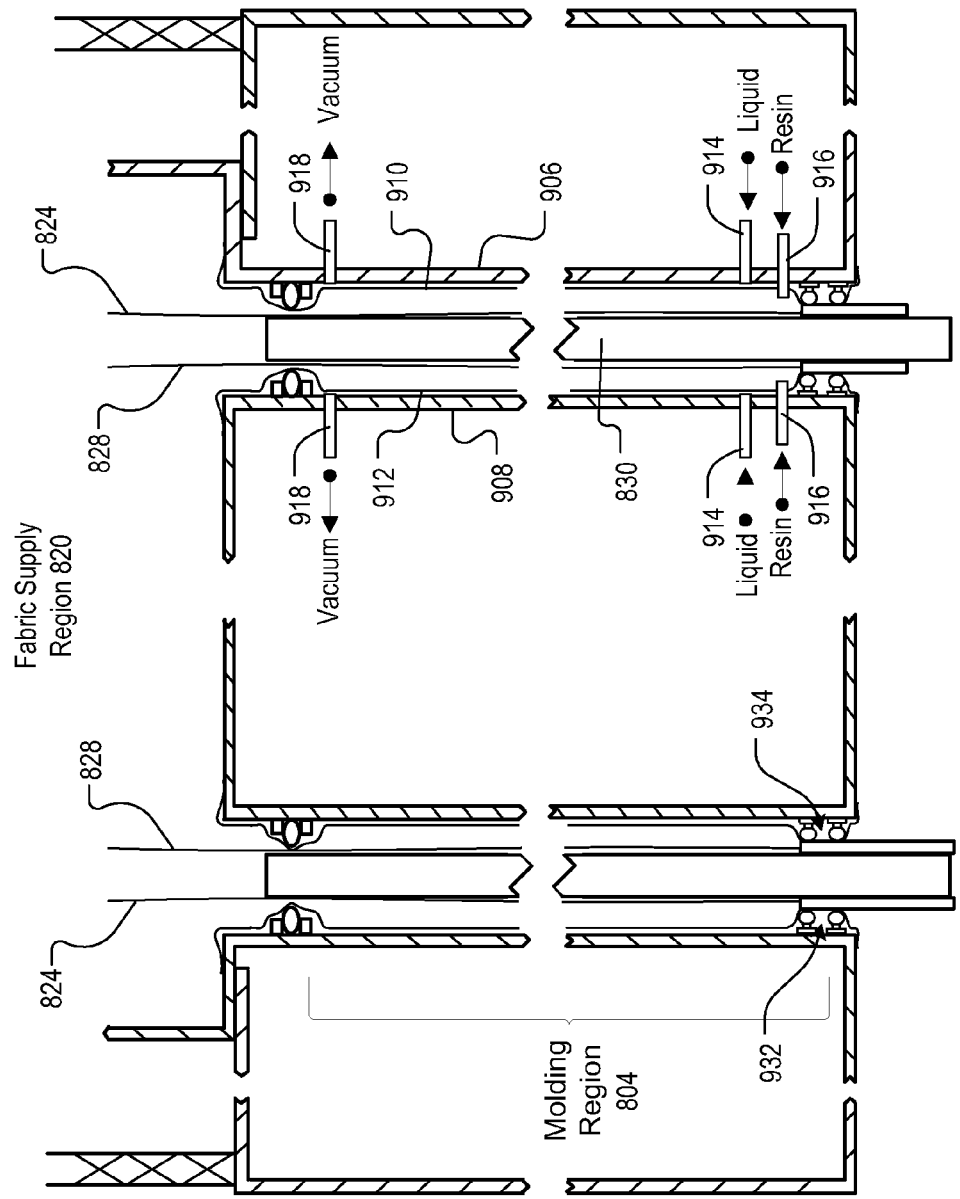
FIG. 9 depicts further detail of the molding apparatus of FIG. 8.

FIG. 7A depicts operation 602A of method 600A, which is the step-wise formation of a vertically-oriented continuous-fiber composite tube, such as tube 410 as used in wind turbine 400. The tube is formed using apparatus 700 for vertical fabrication of continuous-fiber composite tubes. Apparatus 700, which is described in further detail in the disclosure accompanying FIGS. 8 and 9, is disposed on movable floating "platform" 702. The "platform" can be just that—a platform; alternatively, it can be any suitable ship.

As depicted in FIG. 7A, and described further below with respect to FIGS. 10A-10E, with each successive molding run (i.e., shot) of apparatus 700 (as indicated by the horizontal arrows) continuous-fiber composite tube 410 "grows" downward (as indicated by the vertical arrows) below waterline WL. During fabrication, clump weight 711 is added to the "bottom" of the tube 410 to assist in maintaining the vertical orientation of the tube against the prevailing underwater currents, etc.

Successive molding runs or shots are performed using apparatus 700 until continuous-fiber composite pipe 410 reaches its desired length (i.e., the desired length for the spar/tower).

Figure 7B:
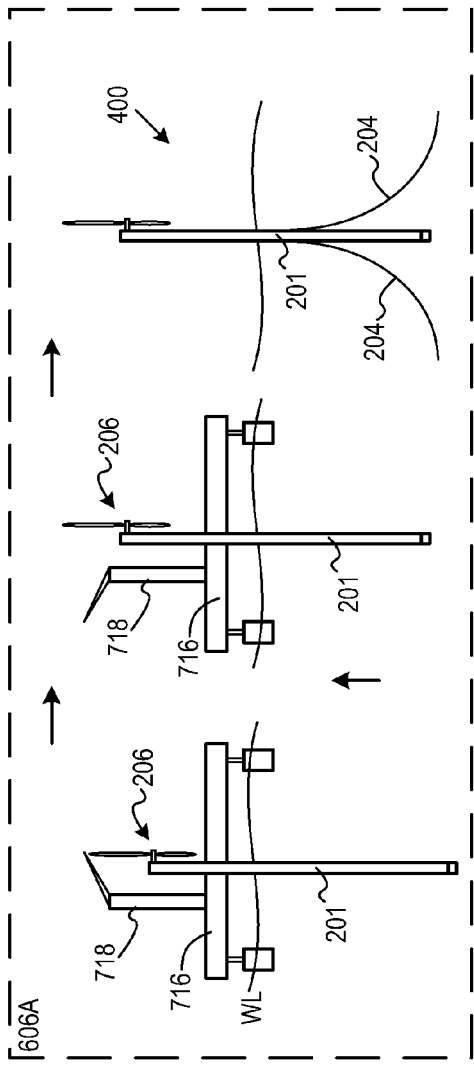
FIG. 7B depicts the installation of the wind turbine on the spar platform in accordance with operation 606A of method 600A.

FIG. 7B depicts operation 606A of method 600A, which, through a sequence of sub-operations indicated by the horizontal arrows, is the coupling of turbine assembly 206 to spar platform 201 (i.e., tube 410) and deployment of the wind turbine. As depicted in FIG. 7B, turbine installation platform 716, which is a movable floating platform like platform 702, is moved into position proximal to tube 410 after movable floating platform 702 is moved out of position. In some other embodiments, tube fabrication and turbine installation are performed using the same platform.

Crane 718 is used to move turbine assembly 206 into position for assembly near to the top of tube 410. As will be appreciated by those skilled in the art, the various sub-operations of operation 606A may require the tube to be floating at different levels in the water. As a consequence, prior to turbine installation, a floatation cap, etc., is added to the tube in known fashion to enable the tube to be ballasted up or down.

Mooring lines 204 are coupled to spar platform 201 and electrical cabling (not depicted) is added to complete offshore wind turbine 400. Turbine installation platform 716, etc., is then moved away to complete the fabrication of another wind turbine within the wind farm.

The fabrication of a tapered top for the spar platform is described later in conjunction with the detailed disclosure of Method 600B (horizontal fabrication).

Apparatus for Vertical Fabrication of Continuous-Fiber Composite Tubes.

FIGS. 8 and 9 depict further detail of apparatus 700 for vertical fabrication of continuous-fiber composite tubes. In FIG. 8, apparatus 700 is depicted on movable floating platform 702. Apparatus 700 fabricates tubes in a vertical orientation implementing a modified vacuum assisted resin transfer molding (VARTM) process, such as disclosed in U.S. Pat. No. 8,025,834 and U.S. Published Pat. Apps. 2011/0169190 and 2011/0062639, previously referenced.

Referring now to FIGS. 8 and 9, in accordance with the illustrative embodiment, apparatus 700 includes molding region 804 and fabric supply region 820. Molding region 804 includes fixed hard outer surface 806, fixed hard inner surface 808, outer soft tool 910 and inner soft tool 912 disposed between the hard inner and outer surfaces, liquid delivery system 914, resin delivery system 916, and vacuum system(s) 918. Both inner 912 and outer 910 soft tools comprise a resilient material, such as a silicone rubber sheet commonly used in molding composite articles. Plural fabric rolls 822 and 826 are disposed in fiber supply region 820 that is located above molding region 804. In typical embodiments, there are several fabric rolls 822 arranged vertically within fiber supply region 820 that feed fabric 824 between core 830 and inner soft tool 912. And there are also typically several fabric rolls 826 arranged vertically within fiber supply region 820 that feed fabric 828 between core 830 and outer soft tool 910. These additional fabric rolls are omitted from FIG. 8 to improve its clarity (see, e.g., FIG. 13). Also, although only a few of the fabric rolls are shown, they are representative of a series of fabric rolls extending completely around the circumference of the workpiece. The fabric strips are therefore dispensed over the full circumference of the workpiece, with overlaps between adjacent strips of fabric, which form overlap splices in the resulting laminate.

As depicted in FIG. 7A, a continuous-fiber composite tube "grows" vertically downward with successive molding runs of apparatus 700. This process of downward vertical "growth" is depicted in further detail in FIGS. 10A through 10E, which depict a simplified representation of apparatus 700. These Figures depict a cross-section through the "left" side of apparatus 700 (compare to FIG. 8).

Fabricating Vertically-Oriented Continuous-Fiber Composite Tubes

FIG. 10A depicts the beginning of the fabrication process wherein core 830 is placed in apparatus 700. In some embodiments, core 830 comprises a pre-assembled ring of "pultruded" core segments (see, e.g., FIG. 11; U.S. Pat. No. 8,025,834 B2 at FIGS. 6-7, item "214"). Fabric 824 and 828 from respective rolls 822 and 826 is then fed into molding region 804. To facilitate the positioning of fabric 824 and 828 within molding region 804, a vacuum is drawn "behind" inner soft tool 912 and outer soft tool 910 (i.e., in the region between the soft tool and the nearest hard surface). The vacuum causes inner soft tool 912 to move toward hard inner surface 808 and outer soft tool 910 to move toward hard outer surface 806. In some embodiments, a resin distribution material (not depicted), which assists in spreading the resin throughout the fabric, is pulled into molding region 804 along with the fabric.

As will become clearer in FIGS. 10B through 10D, core 830 forms the interior of a "sandwich" pipe wall and fabric 824 and 828 forms the face sheets of that sandwich.

After fabric 824 and 828 and core 830 are in place in molding region 804, the vacuum established behind the soft tools 910 and 912 is released. Outer vacuum seal 932 and inner vacuum seal 934 (see FIG. 9) are activated at the bottom of molding region 804 to seal respective soft tools 912 and 910 to seal off the lower portion of molding region 804.

Referring now to FIG. 10B, a vacuum is developed on the "other" side of soft tools 910 and 912 (where the still-dry fabric is disposed) to withdraw air from fabric 824 and 828 in molding region 804, compacting the soft tools and fabric against core 830. This minimizes the void content of the resulting laminate. To avoid having to create a gas-tight seal between fiber supply region 820 and molding region 804 (over the dry, porous fabric, where creating such a seal would be particularly difficult or perhaps even impossible), these two regions are in fluidic communication with one another and are both placed under vacuum.

Fabric 824 and 828 is further compacted against core 830, as depicted in FIG. 10C, by adding liquid "behind" respective outer soft tool 910 and inner soft tool 912. That is, the liquid is added to the region between the hard surfaces and the soft tools. See, FIG. 9, liquid inlets 914. Resin is introduced to the "fabric side" of the soft tools. That is, the resin is added to the region between the soft tools and the core. See, FIG. 9, resin inlets 916. The vacuum is maintained on the fabric side of soft tools 910 and 912 while liquid is maintained behind the soft tools. Resin distributes throughout fabric 824 and 828, rising to a predetermined height (as a function of the quantity of resin added) that does not exceed the region over which compaction is being applied. Pressure is maintained behind the soft tools during resin cure.

In some embodiments, initial cure of the resin to a self-supporting solid is performed at ambient temperature for a period of time in the range of about one to five hours.

Referring now to FIG. 10D, after the resin cures, pressure behind soft tools 910 and 912 is released and vacuum is applied to draw the soft tools toward hard inner surface 808 and hard outer surface 806 and away from the cured laminate ("workpiece") 1036.

In some embodiments, as desired, the cured resin is "post cured," by further heating the resin, such as by circulating hot air or hot water next to workpiece 1036. The intent of the post cure is to increase the amount of cross linking (of the polymer), thereby maximizing corrosion (i.e., general chemical attack of the resin) resistance of the finished article (i.e., the continuous-fiber composite tube). A resin that is suitable for aggressive environments is advantageously selected for use. One such resin is a vinyl ester resin, such as Derakane 8084, which is commercially available from Ashland Inc. of Covington, Ky. In conjunction with the teachings of this specification, those skilled in the art will be able to select a resin suitable for use with apparatus 700 and methods disclosed herein to produce continuous-fiber composite tubes for use in the floating spar platforms disclosed herein.

Per FIG. 10E, once the curing is complete, lower seals 932 and 934 (see FIG. 9) of molding region 804 are released and the brakes (not depicted) on fabric rolls 822 and 826 are released. Workpiece 1036 moves downward out of molding region 804 under the control of a gripping and translating device (not depicted) that lies underneath the molding region and grips the previously cured portion securely. When workpiece 1036 is released, it moves downward into the ocean.

Since there is continuity of fiber between the workpiece and the rolls of fabric, as the workpiece moves downward out of molding region 804, additional fabric is drawn into the molding region. More core material 830 is positioned in molding region 804 and the process is re-run to form a second workpiece (not depicted). The second workpiece has continuity of fiber with the first workpiece as well as the fiber on the rolls. As additional workpieces are formed, the tube "grows" vertically downward into the water. The process continues with repeated shots until the desired length for the growing tube is reached.

A weight (not depicted) is typically attached to the bottom of the first workpiece to ensure that it is negatively buoyant. As the tube extends downward into the water and is exposed to ocean currents, the weight aids in keeping the tube in a vertical orientation.

Figure 11:
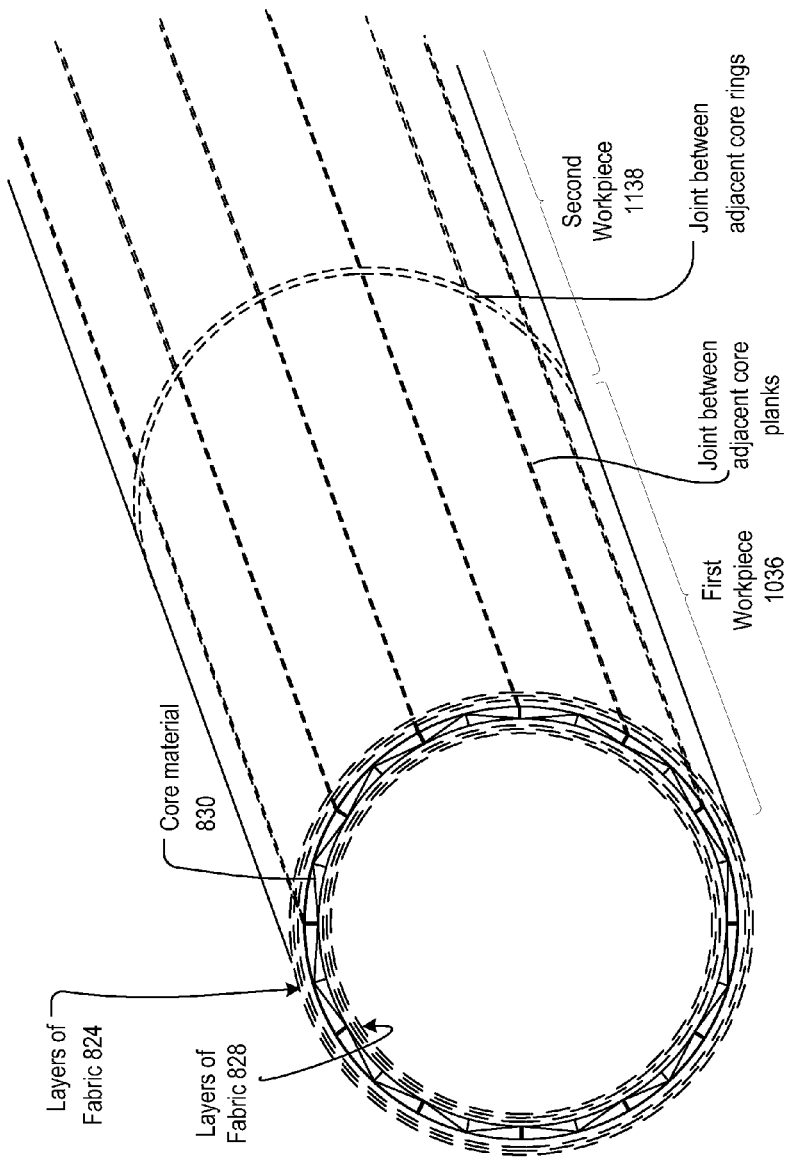
FIG. 11 depicts a continuous-fiber composite tube, as formed via the vertically-oriented molding apparatus of FIGS. 8/9 or the horizontally-oriented molding apparatus of FIG. 14.

FIG. 11 depicts the structure of a portion of a tube formed by the process disclosed above and used to form the spar platforms disclosed herein. In the tube depicted in FIG. 11, fabric layers 828 and 824 lie on both sides of core material 830, sandwiching it, in the manner previously disclosed. As discussed, the tube is formed from a series of discrete workpieces that exhibit "continuity of fiber;" first workpiece 1036 and a second workpiece 1138 are depicted in FIG. 11.

It is to be understood that the "segmented" regions depicted in FIG. 11 are shown for the purpose of illustrating certain secondary features of the tube's construction. The circumferential lines represent the joints between the discrete "rings" of assembled core material 830. The axial lines represent the joints between adjacent sections or planks within any one ring of such core material. The face sheet fabric is continuous over these joints. Since the major load is carried by the face sheets, the finished tube is effectively a unitary article that exhibits a smooth continuous form and behaves structurally as if it is a one-piece tube or pipe.

Method 600B—Horizontal Fabrication

Referring back to FIG. 6B, Method 600B is a method for fabricating and installing off-shore wind turbines wherein the spar platform is fabricated in a horizontal orientation. The various operations of method 600B are depicted in further detail in FIGS. 12A through 12C.

FIG. 12A depicts operation 602B of method 600B, which is the step-wise formation of a horizontally-oriented continuous-fiber composite tube, such as tube 510 as used in wind turbine 500 (see FIG. 5). The tube is formed using apparatus 1200 for horizontal fabrication of continuous-fiber composite tubes. Unlike apparatus 700, which would typically (but not necessarily) be sited at the wind farm itself on a floating platform, apparatus 1200 will typically (but not necessarily) be sited in a harbor near to the location of the wind farm.

Apparatus 1200, which is described in further detail in conjunction with FIG. 14, is adapted from apparatus 700 and includes certain features that enable fabrication of a continuous-fiber composite tube in a horizontal orientation. Successive shots are performed using apparatus 1200 (as indicated by the vertical arrows) until continuous-fiber composite pipe 510 reaches its desired length (i.e., the desired length for the spar/tower).

FIG. 12B depicts optional operation 604B wherein tube 510 is provided, via a sequence of sub-operations indicated by the vertical arrows, with tapered region 514. In the embodiment depicted in FIG. 12B, the tapered portion is added to tube 510 in such a way that continuity-of-fiber is maintained between tube 510 and the tapered region.

As depicted in FIG. 12B, tapered mandrel 1240 is placed at an end of tube 510. Rather than cutting the dry, unused fabric that otherwise remains attached to tube 510 following its fabrication, the fabric is rolled onto mandrel 1240. Resin is then infused into the fabric and cured. After curing, mandrel 1240 is removed. Tapered spar platform 501 results.

The same technique can be used to taper the end of a vertically-fabricated continuous-fiber composite tube, as produced by apparatus 700. After reading this specification, those skilled in the art will be able to adapt the technique disclosed in FIG. 12B to a vertically fabricated pipe. A floatation cap, etc., is added to the tube in known fashion to enable the tube to be ballasted up or down.

After completing optional operation 604B, or after operation 602B if a tapered end is not provided, the spar platform is lowered into the water and towed to the wind farm site (assuming that operations 602B and 604B are conducted in a harbor facility).

FIG. 12C depicts operation 606B of method 600B, which is the coupling of turbine assembly 206 to the spar platform and deployment of the wind turbine. As depicted in FIG. 12C, spar platform 501 is towed to turbine installation platform 716, which is a movable floating platform. The spar platform is "up-ended" at the installation platform so that it adopts a vertical orientation. A weight is attached to the bottom of the spar platform. This assists in maintaining the vertical orientation of the spar platform as it is ballasted down and exposed to ocean currents.

Spar platform 501 is then ballasted down and crane 718 moves turbine assembly 206 into position for coupling to the apex of tapered region 514. The spar platform, with turbine assembly installed, is then raised to operating level.

Mooring lines 204 are coupled to spar platform 501 and electrical cabling (not depicted) is added to complete offshore wind turbine 500. Turbine installation platform 716, etc., is then moved away to complete the fabrication of another wind turbine within the wind farm.

Apparatus for Horizontal Fabrication of Continuous-Fiber Composite Tubes.

FIG. 14 depicts further detail of apparatus 1200 for horizontal fabrication of continuous-fiber composite tubes. Apparatus 1200 is a modification of the apparatus 700 for vertical fabrication of continuous-fiber composite tubes. Like apparatus 700, apparatus 1200 is a modification of a VARTM process.

For pedagogical purposes, apparatus 1200 is described by comparison to apparatus 700, which is depicted again in FIG. 13 with certain features/spacing exaggerated for the sake of clarity.

With respect to apparatus 700 (FIG. 13), fabric 824 and 828 hangs straight down; there are no gravitational (or other) forces pulling the fabric out of alignment. In apparatus 1200, fabric 824 and 828 is dispensed horizontally, and the fabric will tend to sag and pull out of alignment with core 830. This would lead to inadequate properties in the resulting composite tube. This problem is addressed by applying a "tackifier" to the fabric just before it reaches bib rollers 1350 that push the fabric against core 830. The tackifier, which can be a conventional, all-purpose spray adhesive, keeps the fabric against the core to prevent sagging. A suitable tackifier is "3M™ Super 77" brand spray adhesive available from Minnesota Mining and Manufacturing Co. of St. Paul, Minn.

In apparatus 700, the inner molding region hangs from support structure 1352. Completed workpieces are supported by a gripper (not depicted). In-process materials reside on top of the most recently completed workpiece. All support forces are vertical. But in apparatus 1200, substantial radially-directed forces are required to support the inner molding region and in-process materials. In apparatus 1200, the inner and outer molding regions cannot be connected to one another because the in-process materials are between them.

This problem is addressed by adding rollers 1454 at the bottom of both the inner and outer molding regions. The radial forces required to support the inner molding region and in-process material are provided by finished workpieces and the outer molding region.

In apparatus 700, core 830 is supported during initial insertion into the molding region using hanging straps (not depicted), which are removed before resin is infused. In apparatus 1200, core 830 must receive radial support during assembly. This problem is addressed through the use of temporary guides 1456 positioned in apparatus 1200 to support the resulting radial loads.

In apparatus 700, each core "ring" 830*i* (e.g., 830-1, 830-2, 830-3, etc.) is assembled on top of the previous core ring and the load is taken through all previous core rings. In apparatus 1200, each core ring must receive radial support during assembly. This problem is addressed by adding fixturing 1458 (outer on the bottom and inner on top) in the core assembly region to support the resulting radial loads.

In apparatus 700, termination of the resin flow front is controlled by a physical cut in an active portion of the resin distribution material ("RDM"). The stop line is horizontal and the pressure field is the same all along this termination point due to axisymmetry of the apparatus. For apparatus 1200, the desired stop line for the resin flow front is not horizontal (optimally, it is vertical). As a consequence, the pressure field (including gravitational effects) will not be axisymmetric. Since the liquid resin pressure is greater near the bottom of the stop line than the top, the greater pressure would cause the resin to penetrate beyond the desired stop point resulting in an "angled" stop line. This problem is addressed, as necessary, by cutting the active RDM at an angle so that resin flow stops where desired and the stop line is vertical.

Both apparatus 700 for forming vertically-oriented tubes and apparatus 1200 for forming horizontally-oriented tubes produce tubes as a continuous-fiber composite. As previously discussed, this means that reinforcing fibers are continuous throughout the composite, as opposed to being chopped or short (i.e., discontinuous). In embodiments that require multiple molding runs "or shots" to fabricate tubes of a desired long length, as will be the case for a spar platform, fabricating a "continuous-fiber composite" requires "continuity of fiber," as achieved by the method described herein. That is, there must be no discontinuity or break in fibers between the multiple workpieces that compose the tube. As previously discussed, to achieve this means that there must be no discontinuity in fibers between:

fiber in fiber supply region 820 and fiber in the molding region 804 of the molding apparatus, before or after resin is introduced to the molding region; and fiber in molding region 804, either before or after resin is introduced, and a workpiece (e.g., workpiece 1036, etc.); and fiber in fiber supply region 820 and a workpiece.

Example. The following example provides a preliminary design for a spar platform in accordance with the present invention. Most embodiments of spar platforms in accordance with the present invention will include from one to seven tubes. The example design, which is based on the use of a single continuous-fiber composite tube that serves as both spar and tapered support tower as per FIG. 5, is provided by way of illustration, not limitation. In this example, the tube is formed in accordance with method 600B, as depicted in FIGS. 6B, 12A, 12B, and 12C.

| Tube material | Primarily carbon fiber with vinyl ester resin (impact-resistant fiberglass layers are added on external surfaces) |
|---|---|
| Tube thickness | |
| Spar portion* | 28 millimeters (on each side of the core material) |
| Tube length | |
| Spar portion: | 120 meters |
| Tower portion: | 90 meters |
| Tube diameter (Spar portion) | |
| Outer diameter: | 8.725 meters |
| Inner diameter: | 8.609 meters |
| Weights carried | |
| Turbine dry wt: | 386 metric tons |
| Tower portion dry wt: | 156 metric tons |
| Spar portion wet (immersed) wt: | 61 metric tons |

*Face Sheet thickness (does not include core material).

Continuing with the Example, an air-tight bulkhead is placed at the boundary between the spar portion and the tower portion. Additional air-tight bulkheads are placed within the spar portion in order to divide it into plural compartments or "cells." In this Example, the spar portion is divided into five compartments.

The bottom ("keel") of the spar platform is weighted using a 5500 metric ton clump weight (wet). The spar platform supports a wind turbine weighing 386 metric tons capable of generating 5 megaWatts. The hub of the turbine is mounted atop the tower portion of the tube, which rises 90 meters above the ocean surface.

The spar tube diameter is sized for zero net buoyancy when supporting the turbine, tower, spar, and clump weights, assuming that ⅕ of it is flooded. In normal operation, none of it will be flooded and it will ride higher in the water compared to its ⅕ flooded condition. With this design, the spar platform will remain afloat even if one of the five cells were to flood completely.

The spar platform supports an overturning moment of $200\times10^6$ Newton-meters ($1,771\times10^6$ inch-pounds) due to wind loading, and operates within an allowable heel angle of up to about 10 degrees.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for fabricating a floating spar platform, the method comprising:
   providing an apparatus for forming a continuous-fiber composite tube;
   forming, using the apparatus, a first multi-shot continuous-fiber composite ("MSCFC") tube exhibiting continuity of fiber, wherein at least two molding runs of the apparatus, which produce at least two workpieces, are required to form the first MSCFC tube;
   forming a tapered region at an end of the first MSCFC tube by:
   (a) disposing a tapered mandrel at the end of the first MSCFC tube;
   (b) rolling fabric that remains attached to the end of the first MSCFC tube onto the mandrel;
   (c) infusing resin into the fabric; and
   (d) curing the resin; and
   attaching mooring lines to the first MSCFC tube.

2. The method of claim 1 wherein forming the first MSCFC tube further comprises forming the first MSCFC tube vertically.

3. The method of claim 1 further comprising moving the apparatus to an intended site of use of the spar platform.

4. The method of claim 1 further comprising attaching a turbine assembly to an end of the tapered region at the end of the first MSCFC tube.

5. The method of claim 1 wherein forming the first MSCFC tube further comprises forming the first MSCFC tube horizontally.

6. The method of claim 1 further comprising forming a plurality of MSCFC tubes including the first MSCFC tube, wherein the first MSCFC tube is fabricated to be longer than other MSCFC tubes of the plurality of MSCFC tubes, and wherein the first MSCFC tube has the tapered region formed on the end thereof.

7. The method of claim 6 further comprising:
   arranging the plurality of MSCFC tubes so that the first MSCFC tube is surrounded by the other MSCFC tubes; and
   bundling the plurality of MSCFC tubes together.

8. The method of claim 7 further comprising attaching a turbine assembly to an end of the tapered region of the first MSCFC tube.

9. The method of claim 6 wherein the plurality of MSCFC tubes comprises 5 to 7 MSCFC tubes.

10. An apparatus comprising:
    a spar platform, wherein the spar platform comprises a continuous and unitary first multi-shot continuous-fiber composite ("MSCFC") tube, wherein the first MSCFC tube has a cylindrical portion that transitions into a tapered region that extends to an end of the first MSCFC tube, wherein the tapered region exhibits continuity of fiber with the cylindrical portion such that a continuous fiber material extends along an entire length of the first MSCFC tube;
    a turbine assembly coupled to the first MSCFC tube, wherein, when the spar platform is floating in a body of water, the turbine assembly is above a waterline of the body of water; and
    mooring lines coupled to the spar platform.

11. The apparatus of claim 10 wherein the spar platform further comprises a bundle of tubes including the first MSCFC tube, the first MSCFC tube being centrally disposed in the bundle of tubes, and peripheral tubes of the bundle of tubes surrounding the first MSCFC tube, wherein the first MSCFC tube is longer than the peripheral tubes.

12. The apparatus of claim 11 wherein the mooring lines are coupled to at least some of the peripheral tubes.

13. The apparatus of claim 11 wherein the peripheral tubes are MSCFC tubes.

14. The apparatus of claim 11 wherein the first MSCFC tube has a wall thickness that is thicker than a wall thickness of the peripheral tubes.

15. The apparatus of claim 11 wherein in use, most of a length of the peripheral tubes is beneath the waterline.

16. The apparatus of claim 11 wherein in use, most of a length of the first MSCFC tube is above the waterline.

\* \* \* \* \*